Patented Apr. 5, 1949

2,466,412

UNITED STATES PATENT OFFICE 2,466,412

METHOD OF PREPARATION OF HYDRO-CARBON-SUBSTITUTED HALOSILANES

William F. Gilliam, Schenectady, N. Y., and Robert N. Meals, Memphis, Tenn., assignors to General Electric Company, a corporation of New York No Drawing. Application February 21, 1946, Serial No. 649,394

10 Claims. (Cl. 260—448.2)

1

This invention relates to the preparation of organohalosilanes (organo-silicon halides) and more particularly to the production of hydrocarbon-substituted halosilanes (silicon halides).

In Rochow Patent 2,380,995, in Rochow and Patnode Patent 2,380,996, and in Rochow and Gilliam Patent 2,383,818, which patents are assigned to the same assignee as the present application, there are disclosed and broadly claimed methods of preparing organohalosilanes, more particularly hydrocarbon-substituted halogenosilanes, which methods generally comprise effecting reaction between silicon and a hydrocarbon halide. In the more specific embodiments of the above-patented inventions, the hydrocarbon halide is caused to react with the silicon component of a contact mass containing a metallic catalyst for the reaction, for instance copper, said contact mass being in the form of a solid, porous mass, e. g., preformed pellets, or a friable, oxidized alloy of the silicon and the metallic catalyst.

The present invention differs from the inventions disclosed and claimed in the aforementioned patents in that our method of preparing organohalosilanes comprises effecting reaction between the hydrocarbon halide and the silicon component of a powdered mass obtained by comminuting an alloy comprising silicon and a metallic catalyst for the said reaction to a particle size wherein the distribution, by weight, and the particle size, in microns, are as follows: 50 to 100% of the particles are from 74 to 105 microns in diameter, less than 15% are smaller than 44 microns in diameter, and at least 95% are smaller than 149 microns in diameter.

Briefly described, our invention resides in the improved method of preparing hydrocarbon-substituted halosilanes, e. g., alkyl chlorosilanes, bromosilanes, etc., aryl chlorosilanes, bromosilanes, etc., alkyl aryl chlorosilanes, bromosilanes, etc., wherein the hydrocarbon halide is caused to react with an alloy of silicon and a metallic catalyst for the reaction, which alloy has been comminuted to a particular particle size of specific diameter and proportion by weight. By means of this special distribution and particle size, we have discovered that good yields of the hydrocarbon-substituted halosilanes, as well as increased yields of the presently more desirable dihydrocarbon-substituted dihalosilanes, are obtained.

Our present invention differs from the invention disclosed and claimed in our application Serial No. 649,395 filed concurrently herewith and assigned to the same assignee as the present application, in that in the latter application a mixture of silicon and copper powders, each powder being of particular particle size and distribution, by weight, are employed in place of the comminuted copper-silicon alloy used in the present invention.

U. S. Patent 2,380,995 (supra) more fully discloses the methods of effecting reaction between the hydrocarbon halide and the silicon alloy. For example, one specific method comprises bringing a hydrocarbon halide, particularly gaseous methyl chloride, into contact with the silicon-containing alloy, e. g., an alloy comprising a preponderant amount of silicon and a smaller amount of copper, heating the said hydrocarbon halide and silicon-containing alloy at a temperature sufficiently high, e. g., from 200° to 500° C., to effect reaction between the hydrocarbon halide and the silicon component of the alloy, and recovering the hydrocarbon-substituted halosilanes thus formed. For example, the effluent gaseous reaction products may be cooled by suitable means to obtain a condensate comprising the hydrocarbon-substituted halosilanes, specifically the methylchlorosilanes.

According to the disclosures and examples in the aforementioned patent, the silicon-containing alloy may be present in powdered form. However, there is no teaching in this patent that the distribution and particle size of the powdered alloy are important in controlling the yield or type of product obtained.

Previous to our discovery, difficulty was often encountered in controlling the temperature of the reaction between the hydrocarbon halide and the silicon component of the alloy, since such reaction is strongly exothermic once the reaction is initiated. In addition, the yields of the more desirable dihydrocarbon-substituted dihalosilanes, e. g., dimethyldichlorosilane, were of such a variable nature, and quite often present in decreased amounts, that it was usually difficult to predict what proportion of the yield of the hydrocarbon-substituted halosilanes would be the dihydrocarbon-substituted dihalosilane. Such a situation was of considerable disadvantage in the preparation of these compounds under production conditions.

We have now discovered that the above-mentioned disadvantages may be obviated if the silicon-containing alloy mentioned above is comminuted to such a particle size that the distribution, by weight, and the particle size, in microns, are as follows: 50 to 100% of the particles are from 74 to 105 microns in diameter, less than 15% are smaller than 44 microns in diameter, and at least 95% are smaller than 149 microns in diameter. Optimum results are obtained if from 90 to 100% of the silicon alloy particles have a diameter of from 74 to 105 microns and 100% of the particles have a diameter smaller than 420 microns. However, our invention is not to be construed as being limited to these percentages, by weight, and these particle sizes, in microns. By means of our invention, it is possible to increase the yield of the dihydrocarbon-substituted dihalosilane in the reaction product and to more easily control the temperature and predict the course of the reaction. In addition, the type and quantity of the product resulting from the reaction can be predicted with greater certainty than heretofore was possible.

It was quite surprising and unexpected to find that the use of the alloy comminuted to the specific particle size within the proportions embraced by our claimed invention, resulted in better yields and control of the reaction product, than when the particle size of the alloy was of a different diameter and distribution. Actually, in the type of reaction employed in this invention, i. e., the reaction between a hydrocarbon halide and the silicon component of an alloy comprising silicon and a metallic catalyst for the reaction, we discovered that the use of too high a proportion of fine powder, e. g., particles having a diameter of less than 44 microns, was disadvantageous and resulted in decreased yields and poor control of the reaction, rendering it difficult to predict the type and quantity of the products obtained.

In order that those skilled in the art better may understand how the present invention may be practiced, the following examples are given by way of illustration and not by way of limitation. Each example is the average of the results obtained on two simultaneous runs using the identical reactants, i. e., methyl chloride and the same type of comminuted silicon alloy, and comparable conditions of reaction.

The silicon-copper alloy employed in the examples illustrating the concept of this invention was prepared by mixing together, by weight, ten parts copper and ninety parts silicon, melting the mixture in a graphite crucible heated in an induction furnace. The melted mass was then poured into a cast iron mold and cooled. The ingot was surface-cleaned by sandblasting and broken into small lumps. The lumps were crushed in a jaw crusher and further reduced in a disk-grinder. The resulting powder was screened through the required sieves of the U. S. Standard Sieve Series (A. S. T. M. standard), to give the desired particle size fractions. The following table shows the relationship between particle size, expressed in microns, and sieve size expressed in terms of standard sieves of the U. S. Standard Sieve Series.

| U. S. Sieve Numbers | | Diameter of Particles or Particle Size expressed in Microns |
|---|---|---|
| Passing thru | Retained on | |
| −40 | | Smaller than 420 |
| −60 | +100 | 149 to 250 |
| −100 | +140 | 105 to 149 |
| −140 | +200 | 74 to 105 |
| −200 | +325 | 44 to 74 |
| −325 | | Less than 44 |

The diameter of the particles or "particle size" referred to herein, is expressed in microns. The upper limit is defined by the size of the sieve opening (U. S. Standard Sieve Series) through which the particles passed and the lower limit is defined by the size of the sieve opening which retained the particles. For example, reference to particles having a diameter or a particle size less than 420 microns is intended to mean that the particles passed through a No. 40 sieve of the U. S. Standard Sieve Series. Reference to particles having a diameter or a particle size of from 74 to 105 microns means that the particles passed through a No. 140 sieve and were retained on a No. 200 sieve of the aforementioned sieve series.

The reaction in each case was effected in the same manner. With the exception of one example (Example 4 where only 150 grams powder were employed) two hundred grams of the alloy, powdered to the specified screen size, was charged to a U-shaped tubular steel reactor, ¾ inch in diameter. The reactor with its charge, was purged with methyl chloride and then placed in a molten salt bath at 300° C. The flow of the methyl chloride gas was adjusted as closely as possible to 5 grams per hour, and the products, including the methylchlorosilanes, which issued from the exit end of the tube were condensed at a temperature of −18° to −20° C. and analyzed. Under these conditions, negligible amounts of unreacted methyl chloride (B. P. −23.7° C.) would be present in the reaction product.

All the runs, with the exception of the runs performed for Example 4, were conducted within the temperature range of 300–400° C. These runs were started at 300° C. and after the rate of the product obtained for each of the two simultaneous runs fell below 1.5 cc. per hour for a 12-hour period, the temperature of the bath was increased to 325° C. This procedure was continued at intervals of 25° C. until a bath temperature of 400° C. was attained; at this point the run was discontinued when the product rate dropped below 1 cc. per hour. In Example 4, the bath temperature ranged from 250–400° C.; after the rate of the product obtained fell below 1.5 cc. per hour for a 12-hour period, the temperature of the bath was increased 10° C. instead of the 25° C. interval as in the other examples.

During the early phases of many of the runs in which reaction is effected between the hydrocarbon halide and the silicon component of the alloy, the amount of the dihydrocarbon-substituted dihalosilane in the condensed product may range anywhere from about 35 to 80 per cent, by weight, of the total weight of the product obtained up to that time. Generally, in the type of reaction disclosed above, the proportion by weight of the dihydrocarbon-substituted dihalosilane in the condensed product decreases as the silicon component of the alloy is consumed. It is, therefore, essential that to evaluate properly the effects of a certain particle size of the alloy, due consideration be given to the overall picture. This may require that the per cent of the dihydrocarbon-substituted dihalosilane obtained in the condensed product at the end of a run be properly correlated with the actual amount, by weight, of this compound in the condensed product, the time required to obtain this amount of the compound, and the actual per cent of silicon utilized in the preparation of the compound.

Table I shows the different particle sizes employed in the various examples and the per cent, by weight, of the particles within the specified range of the particle diameters.

TABLE I

Screen analysis of powdered alloy in per cent by weight

| Example No. | 250 to 420 microns | 149 to 250 microns | 105 to 149 microns | 74 to 105 microns | 44 to 74 microns | Less than 44 microns |
|---|---|---|---|---|---|---|
| 1 | 0 | 0 | 2.5 | 69.8 | 18.2 | 9.8 |
| 2 | 0 | 0 | 0 | 3.0 | 64.4 | 32.6 |
| 3 | 0.2 | 78.4 | 20.4 | 1.0 | 0 | 0 |
| 4 | 0 | 0 | 0 | 0 | 0 | 100.0 |
| 5 | 21.6 | 34.2 | 16.2 | 10.4 | 6.6 | 11.0 |

Table II shows the conditions of reaction used for each example. The heading "Weight of reaction product" is intended to include the entire product obtained by condensing, at −18° to −20° C., the effluent gases resulting from the reaction between the methyl chloride and the silicon.

TABLE II

| Example No. | Length of Run | Weight of Input $CH_3Cl$ | Weight of Reaction Product | Bath Temperature |
|---|---|---|---|---|
| | Hours | Grams | Grams | Deg. C. |
| 1 | 330 | 1,136 | 716 | 300–400 |
| 2 | 364 | 1,473 | 755 | 300–400 |
| 3 | 496 | 1,548 | 724 | 300–400 |
| 4 | 544 | 2,401 | [1] 540 | [2] 250–400 |
| 5 | 376 | 1,705 | 695 | 300–400 |

[1] Since only 150 grams of the powdered alloy were charged to the reactor in this example, the weight of reaction product should be multiplied by the factor 200/150 which would make the weight of reaction product equal to about 720 grams.
[2] Approximately 6% of the final amount of reaction product was obtained from 250° to 300° C., 94% of the total weight coming over between 300° to 400° C.

Table III shows the results of analyzing the reaction product obtained in each example. The amount of each product obtained is expressed in per cent, by weight, of the total weight of the reaction product. The products listed as "Boiling below 66° C." include compounds boiling below methyltrichlorosilane, such as methyldichlorosilane ($CH_3SiHCl_2$), silicon tetrachloride (slight amounts or traces), trimethylchlorosilane [$(CH_3)_3SiCl$], and negligible amounts of methyl chloride, etc. Dimethyldichlorosilane

[$(CH_3)_2SiCl_2$]

boiling at 70° C. at atmospheric pressure and methyltrichlorosilane ($CH_3SiCl_3$), boiling at 66° C. at atmospheric pressure, are, therefore, the only products boiling at or above 66° C., exclusive of the amount of material listed under the heading "Residue." Thus, the latter heading is intended to refer to those products having a boiling range higher than dimethyldichlorosilane.

TABLE III

Per cent [1] by weight of the reaction product

| Example No. | Boiling Below 66° C. | $CH_3SiCl_3$ | $(CH_3)_2SiCl_2$ | Residue | Weight $(CH_3)_2SiCl_2$ |
|---|---|---|---|---|---|
| | | | | | Grams |
| 1 | 13 | 19 | 63 | 2 | 448 |
| 2 | 21 | 23 | 50 | 3 | 379 |
| 3 | 15 | 23 | 57 | 3 | 412 |
| 4 | 26 | 32 | 32 | 5 | [2] 173 |
| 5 | 17 | 26 | 50 | 3 | 348 |

[1] The total per cent of the reaction product is not equal to 100 per cent because of certain unpreventable handling losses.
[2] Since only 150 grams of the powdered alloy were charged to the reactor in this example, the weight of $(CH_3)_2SiCl_2$ should be multiplied by the factor 200/150 which would make the yield equal to about 231 grams.

From the results of the foregoing examples, it is apparent that by employing the silicon-copper alloy comminuted to a particle size within the limits of our claimed invention, it is possible to obtain greater yields of the more desirable dimethyldichlorosilane than when the particle size is outside these limits. A comparison of the results of the runs for Example 1 with the results of the runs for Examples 2, 4 (see note under Example 4) and 5 shows that the increased yield obtained in Example 1 ranges from approximately 18% to 94% greater than the yields obtained in the other examples.

Although the weight of dimethyldichlorosilane in Example 1 was only 8.7% greater than the weight of the same material in Example 3, due consideration must be given to the fact that only 330 hours were required in Example 1 to obtain 448 grams of dimethyldichlorosilane, while in Example 3, 496 hours were required to obtain 412 grams of the same material.

In the following examples (1a and 4a) 200 gram charges of powders having the screen analyses, respectively, as shown in Table I for Examples 1 and 4, were employed in runs wherein the temperature was maintained at 300° C. throughout the runs and the time of reaction was approximately the same (114 hours in the case of Example 1a and 116 hours in the case of Example 4a). The procedure used in conducting the runs was the same as in the previous examples. In Example 1a, 428 grams of methyl chloride were put into the system to yield 370 grams of product. In Example 4a, 728 grams of methyl chloride were passed into the system to yield 254 grams of product. Table IV shows the results of analyzing the reaction product obtained in each example.

TABLE IV

Per cent by weight of the reaction product

| Example No. | Boiling below 66° C. | $CH_3SiCl_3$ | $(CH_3)_2SiCl_2$ | Residue | Weight $(CH_3)_2SiCl_2$ |
|---|---|---|---|---|---|
| | | | | | Grams |
| 1a | 9 | 8 | 77 | 2 | 284 |
| 4a | 16 | 18 | 62 | 1 | 158 |

NOTE: About 37% of the fraction of the reaction product in Example 4a boiling below 66° C. consisted of methyldichlorosilane.

It will be understood, of course, by those skilled in the art that our invention is not limited to the specific hydrocarbon halide used in the above illustrative examples and that any other hydrocarbon halide or mixtures of hydrocarbon halides may be employed as a reactant with the silicon, the conditions of reaction generally being varied depending upon the particular starting hydrocarbon halide and the particular end-products desired. In general, the vapor-phase reactions are preferred because they can be carried out more economically, may be controlled more easily and may be directed toward the production of the desired organohalosilanes.

Likewise, the invention is not limited to the specific temperatures or temperature ranges mentioned in the examples. However, the reaction temperature should not be so high as to cause an excessive deposition of carbon upon the unreacted silicon. In general, the reaction temperature to be used will vary with, for instance, the particular hydrocarbon halide employed, the particular catalyst used and the yields of the specific reaction products desired to be obtained from a particular starting hydrocarbon halide. At temperatures of the order of 200° C. the reaction proceeds much more slowly than at reaction temperatures around 250° to 400° C. At temperatures much above 400° C. in the case of methyl chloride, for example, there is a vigorous exothermic reaction which generally results in an undesirable deposition of carbon in the reaction tube. Optimum results usually are obtained within the more limited range of 250° to 400° C.

It will be understood by those skilled in the art that metallic catalysts other than copper may be employed to form the silicon alloy. Examples of such catalysts, in addition to copper, are nickel, tin, antimony, manganese, silver, titanium, etc.

As pointed out in U. S. Patent 2,380,997, issued August 7, 1945, to Winton I. Patnode, and assigned to the same assignee as the instant application, the silicon alloy employed in the present invention may consist of various proportions of the silicon and metallic catalyst components. Preferably, however, the alloy consists substantially of a preponderant proportion of silicon and a minor proportion of copper or other metallic catalyst for the reaction between the silicon and the hydrocarbon halide. A more specific example of such an alloy is the product obtained by melting a mixture comprising, by weight, from 2 to 45 per cent of the metallic catalyst, specifically copper, and from 98 to 45 per cent silicon, these components being present in the form of solids, powdered granules, etc. Particularly good results from a practical standpoint are obtained with an alloy produced, e. g., by melting a mixture of, by weight, from 5 to 25% copper and from 95 to 75% silicon. After the components have been alloyed, the cooled ingot thus formed may be broken up into lumps and ground to the required size. U. S. Patent 2,380,997 (supra) discusses other methods which may be employed in preparing a silicon contact mass which is to be comminuted to the specific distribution and particle size in accordance with our claimed invention.

With further reference to the production of methylchlorosilanes, it may be said that the efficient utilization of methyl chloride is enhanced as the proportion of the metallic catalyst, specifically copper, is increased up to about 10% and that no material advantage from the standpoint of maximum yield of reaction products per unit weight of methyl chloride employed ordinarily accrues from using an alloy in our invention containing much over 20 or 25 per cent copper.

The present invention provides a new and improved method for the production of alkyl halosilanes (e. g., methyl, ethyl, propyl, butyl, amyl, isoamyl, hexyl, etc. halosilanes), the aryl halosilanes (e. g., phenyl halosilanes, etc.), the aryl-substituted aliphatic halosilanes (e. g., phenylethyl halosilanes), and the aliphatic-substituted aryl halosilanes (e. g., totyl halosilanes, etc.).

The products of this invention have utility as intermediates in the preparation of other products. For instance, they may be employed as starting materials for the manufacture of silicone resins. They may also be used as agents for treating water-non-repellent bodies to make them water-repellent as disclosed and claimed in the patent to Winton I. Patnode, U. S. 2,306,222, issued December 22, 1945, and assigned to the same assignee as the present invention.

What we claim as new and desire to secure by Letters Patent of the United States is:

1. The method of preparing hydrocarbon-substituted halogenosilanes which comprises effecting reaction at an elevated temperature between a hydrocarbon halide and the silicon component of a powdered alloy comprising silicon and a metallic catalyst for the said reaction wherein the distribution, by weight, and the particle size, in microns, of the particles of powdered alloy are as follows: 50 to 100% of the particles are from 74 to 105 microns in diameter, less than 15% are smaller than 44 microns in diameter, and at least 95% are smaller than 149 microns in diameter.

2. The method of preparing hydrocarbon-substituted halogenosilanes which comprises effecting reaction at an elevated temperature between a hydrocarbon halide and the silicon component of a powdered alloy comprising silicon and copper wherein the distribution, by weight, and the particle size, in microns, of the particles of powdered alloy are as follows: 50 to 100% of the particles are from 74 to 105 microns in diameter, less than 15% are smaller than 44 microns in diameter, and at least 95% are smaller than 149 microns in diameter.

3. The method of preparing anylhalosilanes which comprises effecting reaction at an elevated temperature between an aryl halide and the silicon component of a powdered alloy comprising silicon and a metallic catalyst for the said reaction wherein the distribution, by weight, and the particle size, in microns, of the particles of powdered alloy are as follows: 50 to 100% of the particles are from 74 to 105 microns in diameter, less than 15% are smaller than 44 microns in diameter, and at least 95% are smaller than 149 microns in diameter.

4. The method of preparing alkyl halosilanes which comprises effecting reaction at an elevated temperature between an alkyl halide and the silicon component of a powdered alloy comprising silicon and a metallic catalyst for the said reaction wherein the distribution, by weight, and the particle size, in microns, of the particles of powdered alloy are as follows: 50 to 100% of the particles are from 74 to 105 microns in diameter, less than 15% are smaller than 44 microns in diameter, and at least 95% are smaller than 149 microns, in diameter.

5. The method of preparing alkyl halosilanes which comprises effecting reaction at an elevated temperature between an alkyl halide in a vapor state and the silicon component of a powdered alloy comprising silicon and copper wherein the distribution, by weight, and the particle size, in microns, of the particles of powdered alloy are as follows: 50 to 100% of the particles are from 74 to 105 microns in diameter, less than 15% are smaller than 44 microns in diameter, and at least 95% are smaller than 149 microns in diameter.

6. The method of preparing methylchlorosilanes which comprises effecting reaction at an elevated temperature between methyl chloride and the silicon component of a powdered alloy comprising (1) a preponderant amount of silicon and (2) a metallic catalyst for the said reaction wherein the distribution, by weight, and the particle size, in microns, of the particles of powdered alloy are as follows: 50 to 100% of the particles are from 74 to 105 microns in diameter, less than 15% are smaller than 44 microns in diameter, and at least 95% are smaller than 149 microns in diameter.

7. The method of preparing increased yields of dimethyldichlorosilane which comprises effecting reaction at an elevated temperature between gaseous methyl chloride and the silicon component of a powdered alloy comprising (1) a preponderant amount of silicon and (2) copper wherein the distribution, by weight, and the particle size, in microns, of the particles of powdered alloy are as follows: 50 to 100% of the particles are from 74 to 105 microns in diameter, less than 15% are smaller than 44 microns in diameter, and at least 95% are smaller than 149 microns in diameter.

8. The method of preparing increased yields of dimethyldichlorosilane which comprises bringing gaseous methyl chloride into contact with the silicon component of a powdered alloy comprising (1) a preponderant amount of silicon and (2) copper wherein the distribution, by weight, and the particle size, in microns, of the particles of powdered alloy are as follows: 50 to 100% of the particles are from 74 to 105 microns in diameter, less than 15% are smaller than 44 microns in diameter, and at least 95% are smaller than 149 microns in diameter, thereafter heating the said methyl chloride and powdered mass at a temperature sufficiently high to effect reaction between the methyl chloride and the silicon component of said mass, and recovering the dimethyldichlorosilane.

9. The method which comprises causing gaseous methyl chloride to react with the silicon component of a powdered alloy comprising (1) a preponderant amount of silicon and (2) copper wherein the distribution, by weight, and the particle size, in microns, of the particles of powdered alloy are as follows: 50 to 100% of the particles are from 74 to 105 microns in diameter, less than 15% are smaller than 44 microns in diameter, and at least 95% are smaller than 149 microns in diameter, said reaction being effected within the temperature range of 200° to 500° C., cooling the effluent gases to obtain a condensate comprising methylchlorosilanes.

10. The method of obtaining increased yields of dimethyldichlorosilane which comprises (1) bringing gaseous methyl chloride at a temperature of from 250° to 400° C. into contact with the silicon component of a finely divided alloy consisting essentially, by weight, of from 5 to 25 per cent copper and from 95 to 75 per cent silicon, wherein the distribution, by weight, and the particle size, in microns, of the particles of finely divided alloy are as follows: 90 to 100% of the particles are from 74 to 105 microns in diameter, and 100% of the particles are smaller than 420 microns in diameter, (2) cooling the gases to obtain a condensate containing the dimethyldichlorosilane, and (3) fractionally distilling the condensate to isolate dimethyldichlorosilane.

WILLIAM F. GILLIAM.
ROBERT N. MEALS.

REFERENCES CITED

The following references are of record in the file of this patent:

UNITED STATES PATENTS

| Number | Name | Date |
| --- | --- | --- |
| 2,343,731 | Bailie et al. | Mar. 7, 1944 |
| 2,353,505 | Scheineman | July 11, 1944 |
| 2,380,995 | Rochow | Aug. 7, 1945 |
| 2,380,996 | Rochow et al. | Aug. 7, 1945 |
| 2,380,997 | Patnode | Aug. 7, 1945 |
| 2,383,818 | Rochow et al. | Aug. 28, 1945 |
| 2,389,931 | Reed et al. | Nov. 27, 1945 |

FOREIGN PATENTS

| Number | Country | Date |
| --- | --- | --- |
| 270,313 | Great Britain | Sept. 28, 1928 |
| 352,746 | Italy | Sept. 21, 1937 |